| United States Patent [19] | [11] 3,909,496 |
| --- | --- |
| Kwan | [45] Sept. 30, 1975 |

[54] PREPARATION OF 2,5-DIBROMOTEREPHTHALATE UNSATURATED POLYESTER

[75] Inventor: Fred K. C. Kwan, La Grange, Ill.

[73] Assignee: Standard Oil Company, Chicago, Ill.

[22] Filed: Dec. 6, 1973

[21] Appl. No.: 422,260

Related U.S. Application Data

[63] Continuation-in-part of Ser. No. 307,045, Nov. 16, 1972, abandoned.

[52] U.S. Cl. ........ 260/75 H; 260/75 M; 260/75 UA; 260/869

[51] Int. Cl.² .................. C08G 63/68; C08G 63/56

[58] Field of Search ...................... 260/75 H, 75 UA

[56] References Cited

UNITED STATES PATENTS

| | | | |
| --- | --- | --- | --- |
| 2,904,533 | 9/1959 | Carlston et al. | 260/75 |
| 3,265,762 | 8/1966 | Quisenberry | 260/860 |
| 3,409,704 | 11/1968 | Bailey | 260/860 |

FOREIGN PATENTS OR APPLICATIONS 1,294,986    4/1962    France

OTHER PUBLICATIONS

Kirk–Othmer, Encycl. Chem. Technol. Vol. 20, Wiley, N.Y., 1969 (p. 799).

*Primary Examiner*—Melvin Goldstein
*Attorney, Agent, or Firm*—William H. Magidson; Arthur G. Gilkes; William T. McClain

[57] ABSTRACT

Fire retardant polyester prepared by reacting under polyesterification conditions a polyhydric alcohol, 2,5-dibromoterephthalic acid and an alpha, beta-ethylenically unsaturated dicarboxylic acid, wherein said 2,5-dibromoterephthalic acid provides from about 5 to 90 percent of the acyl equivalents and said alpha, beta-ethylenically unsaturated dicarboxylic acid provides from 10 to 75 percent of the acyl equivalents.

1 Claim, No Drawings

PREPARATION OF 2,5-DIBROMOTEREPHTHALATE UNSATURATED POLYESTER

This application is a continuation-in-part of Ser. No. 307,045 filed Nov. 16, 1972, now abandoned.

This invention relates to the production of polyesters based on 2,5-dibromoterephthalic acid.

French Patent 1,294,986 discloses that brominated benzene dicarboxylic acids can be used to produce fire retardant polyesters. The patentee indicates that the brominated aromatic dicarboxylic acids (or anhydrides), maleyl compound (alpha, beta-ethylenically unsaturated dicarboxylic acid or anhydride) and polyol can all be condensed together in a single stage cook and specifically exemplifies the process using various di and tetrabromophthalic acids and/or anhydrides. The patentee neither identifies any specific brominated isophthalic or terephthalic acids nor exemplifies how one would produce a polyester of this type. This is not too surprising when one considers that (1) isophthalic acid is much less reactive than phthalic acid (or anhydride), (2) terephthalic acid is less reactive than isophthalic acid, (3) isophthalic acid is normally incorporated into polyesters of this type in a two-stage cook wherein substantially all of the isophthalic acid is condensed with polyol under forcing conditions to form a prepolymer and maleyl compound is then reacted with the prepolymer, (4) the isophthalic acid two-stage process is used to prevent breakdown of the maleyl compound during condensation of the isophthalic acid, and (5) terephthalic acid is rarely used in polyesters of this type.

The general object of this invention is to provide polyesters based on a different bromine containing benzene dicarboxylic acid and techniques for producing said polyesters. Other objects appear hereinafter.

I have now found that 2,5-dibromoterephthalic acid is unusually reactive and can be used to produce polyesters by a variety of techniques. This is particularly surprising when one considers that terephthalic acid is a relatively sluggish reactant and tetrabromoterephthalic acid is almost inert.

Briefly, 2,5-dibromoterephthalic acid can be incorporated into unsaturated polyesters by reacting 2,5-dibromoterephthalic acid, alpha, beta-ethylenically unsaturated dicarboxylic acid and polyol. The reaction can be carried out in a single stage cook, such as by reacting 2,5-dibromoterephthalic acid, maleyl compound and polyol together. If desired, 2,5-dibromoterephthalic acid and polyol can be condensed together followed by reacting alpha, beta-ethylenically unsaturated dicarboxylic acid alone or together with additional polyol with the prepolymer in the same manner as isophthalic acid is converted to polyester. This two-stage cook is much faster than the typical isophthalic acid two-stage cook. Alternatively, a two-stage cook can be employed wherein alpha, beta-ethylenically unsaturated dicarboxylic acid and polyol are condensed together in a first stage and then 2,5-dibromoterephthalic acid alone or together with additional polyol are added and condensed.

The 2,5-dibromoterephthalic acid can provide from 5 to 90 equivalent percent of the acyl groups in the polyester, preferably from about 10 to 75 percent of the acyl equivalents, while the alpha, beta-ethylenically unsaturated dicarboxylic acid can provide from about 10 to 95 percent of the acyl equivalents, preferably 25 to 90 percent. In general, the higher the concentration of alpha, beta-ethylenically unsaturated dicarboxylic acid the more reactive the polyester (the faster the gel time and cure time when mixed with copolymerizable monomers such as styrene). On the other hand, the higher the concentration of the 2,5-dibromoterephthalic acid, the better the fire retardant properties of the polyester. For example, polyesters containing a high concentration of 2,5-dibromoterephthalic acid moieties can be diluted with more flammable components (styrene, other flammable polyesters, etc.) than polyesters containing a low concentration of 2,5-dibromoterephthalic acid moieties without loss of fire retardant properties.

Suitable alpha, beta-ethylenically unsaturated dicarboxylic acids or maleyl compounds useful in this invention include maleic acid, maleic anhydride, fumaric acid, itaconic acid, itaconic anhydride, etc. If desired, other polycarboxylic acids, such as trimellitic anhydride, adipic acid, sebacic acid, phthalic anhydride, tetrahydrophthalic anhydride, endomethylene-tetrahydrophthalic anhydride, isophthalic acid, terephthalic acid, tetrabromophthalic acid, 4,6-dibromoisophthalic acid, etc., can provide from 0 to 85 percent of the acyl equivalents, preferably from 0 to 20 percent of the acyl equivalents.

The polyhydric alcohols useful in this invention include diols or dihydric alcohols such as ethylene glycol, propylene glycol, diethylene glycol, triethylene glycol, tetraethylene glycol, neopentyl glycol, hexamethylene glycol, etc. Of these, propylene glycol is preferred for molding compositions and triethylene glycol is preferred for air-drying polyesters. Various polyfunctional alcohols containing three or more hydroxyl groups can be used in small amounts such as pentaerythritol, 1,1,1-trimethylol propane, 1,1,1-trimethylol ethane, glycerol, ethylene oxide and/or propylene oxide adducts of sorbitol, etc. Likewise, monohydric alcohols can be employed for air-drying properties, such as tetrahydrofuryl alcohol, triallyl ethers of pentaerythritol, diallyl ethers of 1,1,1-trimethylol propane, etc. The concentration of hydroxyl compound in the polyesterification reaction is generally chosen to give approximate equivalency, or a slight excess over such equivalency, as to the sum of the ethylenically unsaturated dicarboxylic acids, 2,5-dibromoterephthalic acid plus any additional saturated dicarboxylic acid or tricarboxylic acid. Usually the excess of hydroxyl compound over acyl equivalency will not exceed about 10 percent to 25 percent and it may be lower. The excess facilitates reduction of the acid number of the resulting polyester.

In the typical one-stage condensation, esterification can be effected in accordance with known methods. In this type of reaction the polycarboxylic acids and polyols are all added to the reaction vessel. Acid catalysts may be added. The reaction is conducted under a protective, non-oxidizing atmosphere, such as an atmosphere of carbon dioxide or nitrogen gas. Xylene or other non-reactive solvents, which form an azeotrope with water, can be included and the reaction can be conducted by heating the mixture to reaction temperature, e.g., to that temperature at which water is expelled from the system. Heating is usually continued until water ceases to be evolved and until the acid value of the polyester is between about 5 to 40, preferably 10 to 25. The condensation should not be continued so long as to result in infusability of the polyester or to give polyesters of such high molecular weight as will prevent the finished composition from becoming homogeneous, single-phase, cured masses at the cure temperature. Generally, the polyester should have a molecular weight between approximately 1,000 and 25,000.

Usually a temperature of approximately 135°C. to 220°C. and a reaction time of 2 to 20 hours is sufficient to effect esterification in a single stage. After the desired acid value has been reached the resulting mass is then cooled to a relatively low temperature and a polymerization inhibitor is added such as hydroquinone, resorcinol, catechol, tertiary butyl catechol, symmetrical di-beta-naphthylparaphenylene diamine, etc. If desired, the inhibitor may be added during the condensation reaction.

In the two stage cooks, substantially all of the appropriate polycarboxylic acid compound of one type (maleyl compound or 2,5-dibromoterephthalic acid) and polyol are reacted under the polyesterification conditions described above for the single stage cook until the prepolymer has an acid number of 5 to 60. Substantially all of the second type of polycarboxylic acid compound or mixture of polycarboxylic acid and additional polyol are then condensed under the conditions described above until the polyester has an acid number of about 5 to 40. If desired, other polycarboxylic acids can be added in either stage.

The ethylenically unsaturated polyester prepared by any of these routes is then dissolved in a liquid vinylidene monomer, such as styrene vinyl toluene, alphamethyl styrene, divinyl benzene, diallyl phthalate, alkyl esters of alpha, beta ethylenically unsaturated monocarboxylic acids such as ethyl acrylate, methyl methacrylate, etc. Mixtures of two or more of the copolymerizable ethylenically unsaturated monomers may be used. Generally, the vinylidene monomers are present in the compositions of this invention in an amount of from about 15 to 70 percent and preferably in an amount of from 30 to 60 percent based on the total weight of the components.

The lacquers and/or casting compositions obtained by dissolving together the polyester in the appropriate monomer with or without the appropriate stabilizers are preferably cured by incorporating conventional curing catalysts in amounts between about 0.1 percent by weight of the polyester composition and 8 percent. Suitable peroxide catalysts which yield free-radicals initiating polymerization in the presence of metal dryers include 1-hydroxyl-1-hydroperoxy-dicyclohexyl-peroxide; 1,2,3,4-tetrahydronaphthalene-1-hydroperoxide; benzoyl peroxide; cyclohexanone peroxide; cumene hydroperoxide; methyl ethyl ketone peroxide, etc. Other catalyst systems that release free-radicals are also applicable, such as the combination of tertiary amines (dimethyl aniline or dimethyl toluidine) with peroxide.

The polyester-vinylidene monomer compositions can be compounded with various innocuous additives, such as inert fillers (zinc oxide, titanium dioxide, hydrated alumina, etc.) or other fire retardant agents such as phosphorus compounds (triphenyl phosphite), filler (antimony trioxide), etc. The fire retardants lower the level of bromine in the polyester necessary to impart a particular level of fire retardancy.

The following examples are merely illustrative.

EXAMPLE I

One and twelve-hundredths moles propylene glycol was heated to 170°F. in a 3-neck reactor, equipped with heating mantle, packed column with low-pressure steam jacket, agitator, distilling head, an inert gas sparge tube an a thermometer. After agitation was begun using nitrogen introduced through the gas sparge tube, 0.48 mole 2,5-dibromoterephthalic acid was added gradually to the reactor. The reactor temperature was raised slowly to a temperature of 330°F. at which point the reaction mixture became suddenly clear and water of esterification began to appear in the distilling head. The temperature was maintained in the range of 390°–400°F., until the polyester reached an acid value of 15–20, about 3 hours. After cooling the first stage reaction to 320°F., 0.52 mole of maleic anhydride was added and the reaction mixture was heated to about 390°–400°F. Upon reaching an acid number of 40, the excess glycol was removed by purging with inert gas. Purging was continued until the acid number of the reaction mixture reached 18 to 25. The Gardner viscosity was X–Y at 70% nonvolatile materials with 3% benzoquinone inhibitor present. The polyester was then reduced with a solution of 30% styrene containing 150 ppm of hydroquinone inhibitor.

EXAMPLE II

Using the same apparatus as that of Example 1, 1.12 moles of propylene glycol and 0.52 mole of maleic anhydride were agitated with nitrogen gas while being heated to a temperature of 190°F. The reaction was continued until the propylene glycol half ester of maleic anhydride was formed and a clear solution was obtained. At this point, 0.48 mole of 2,5-dibromoterephthalic acid was slowly added to the reactor. The temperature of the reaction was then increased to 310°–320°F., at which point distillate began to appear. The reaction was continued and the temperature of the reactor was slowly increased to a maximum temperature in the range of about 390°–400°F. When the temperature in the distilling column dropped to below 175°F., the packed column was removed and distillate was vented directly through the neck of the flask. The polyester resin had a Gardner viscosity of W–X, and the acid number was 20 to 27. After the polyester was cooled to 380°F., 100 ppm of hydroquinone was added, and the resin was reduced with 30% by weight of styrene.

Examples 1 and 2 indicate two different ways of producing the desired brominated resin product. The products of both methods exhibit similar characteristics. The characteristics are shown in Table 1 below:

TABLE I

| | |
|---|---|
| Bromine content of the solid resin | 28.91 |
| Bromine content of resin at 70% solid in styrene | 20.50% |
| Viscosity (Gardner-Holdt) | X–Y |
| Color (Gardner-Holdt) | 1–2 |
| Society of Plastic Industry Exotherm Data | |
| Gel time | 6 minutes, 11 seconds |
| Total reaction time | 7 minutes, 48 seconds |
| Peak temperature | 410–425°F. |

The resin product can be cured with either benzoyl peroxide at 180°–240°F., or methyl ethyl ketone peroxide with cobalt acetate or naphthenate at a temperature of 65°–85°F.

The physical properties of the resinous product were determined by an ASTM procedure. Table II indicates the physical properties for resins prepared by either method as outlined in Examples 1 and 2.

It is apparent from Table II that the polyester resins retained good fire retarding properties without changing physical properties.

TABLE II

Comparative Proportion of Brominated Polyesters

| | Dibromopolyester Examples I & II | TBPA* | Commercially Available and Used Fire Retardants Commercial Chlorine Containing Resins | TCTA Type** | Commercial Bromine Type |
|---|---|---|---|---|---|
| Halogen content % | $Br_2$ (20%) | $Br_2$ (20%) | $Cl_2$ (20%) | $Cl_2$ (20%) | $Br_2$ (? %) |
| Flex. strength psi | 14,000 | 11,000 | 11,000 | | |
| Flexural Modulus $10^{-6}$ psi | 0.56 | 0.65 | 0.54 | | |
| Heat Distortion temp. | 115°C. | 81°C. | 111°C. | 107°C. | — |
| Flame retardancy Test rating | | | | | |
| ASTM D636 | Non-burning | Non-burning | Non-burning | Self-extinguishing | Non-burning |
| HLT-15 | 80 | 80 | 100 with additive | 20 | 80 without additive |
| Remark on processing of resin | easy straight forward Resin clear | Need buffer NaO Ac Resin hazy | | | |

Not available for clear resin casting.
*Tetrabromophthalic anhydride — Michigan Chemical Co.
**Tetrachlorophthalic anhydride bromine.

I claim:

1. The method of forming a fire retardant polyester comprising a polyhydric alcohol, 2,5-dibromoterephthalic acid and an alpha, beta-ethylenically unsaturated dicarboxylic acid, wherein said 2,5-dibromoterephthalic acid provides from about 5 to 90 percent of the acyl equivalents and said alpha, beta-ethylenically unsaturated dicarboxylic acid provides from 10 to 95 percent of the acyl equivalents, which comprises the steps of reacting under polyesterification conditions in a first stage substantially all of said alpha, beta-ethylenically unsaturated dicarboxylic acid with polyhydric alcohol and in a second stage substantially all of said 2,5-dibromoterephthalic acid.

* * * * *